US012670265B1

(12) United States Patent
Lysenko et al.

(10) Patent No.: US 12,670,265 B1
(45) Date of Patent: Jun. 30, 2026

(54) AUTOMATIC TEST GENERATION FOR IMPACT OF PATCHING SOFTWARE PACKAGE VULNERABILITIES

(71) Applicant: Socket, Inc., Wilmington, DE (US)

(72) Inventors: Mikola Christopher Lysenko, Midland, MI (US); Feross Hassan Aboukhadijeh, San Francisco, CA (US); Wenxin Jiang, West Lafayette, IN (US)

(73) Assignee: Socket, Inc., Wilmington, DE (US)

( * ) Notice: Subject to any disclaimer, the term of this patent is extended or adjusted under 35 U.S.C. 154(b) by 0 days.

(21) Appl. No.: 19/408,229

(22) Filed: Dec. 3, 2025

Related U.S. Application Data

(60) Provisional application No. 63/884,017, filed on Sep. 18, 2025, provisional application No. 63/869,804, filed on Aug. 25, 2025, provisional application No. 63/818,506, filed on Jun. 5, 2025.

(51) Int. Cl.
G06F 21/57 (2013.01)

(52) U.S. Cl.
CPC ...... G06F 21/577 (2013.01); G06F 2221/033 (2013.01)

(58) Field of Classification Search
None
See application file for complete search history.

(56) References Cited

U.S. PATENT DOCUMENTS

| | | | | |
|---|---|---|---|---|
| 10,282,550 | B1 * | 5/2019 | Sheridan | .................. G06F 8/65 |
| 11,599,636 | B1 * | 3/2023 | Pilli | ..................... G06F 21/577 |

| | | | | |
|---|---|---|---|---|
| 11,893,120 | B1 * | 2/2024 | Jennings | ................. G06F 8/433 |
| 11,934,533 | B2 | 3/2024 | Golan et al. | |
| 12,314,394 | B2 | 5/2025 | Aboukhadijeh et al. | |

(Continued)

FOREIGN PATENT DOCUMENTS

| | | | | |
|---|---|---|---|---|
| AU | 2002360844 | A1 | 7/2003 | |
| CN | 118051918 | A * | 5/2024 | ............... G06F 8/71 |

(Continued)

OTHER PUBLICATIONS

Wang et al., "PatchRNN: A Deep Learning-Based System for Security Patch Identification", arXiv:2108.03358v2, 2023 (Year: 2023).*

(Continued)

*Primary Examiner* — Piotr Poltorak
(74) *Attorney, Agent, or Firm* — Fenwick & West LLP

(57) ABSTRACT

An application determines versions of a software package, and runs a test having a plurality of components on each version. The application generates a matrix of vectors, each vector corresponding to a given version of the software package and having a results cell for each component of the test, the cell populated with a result, where each vector is different. The application identifies a patch for a given version of the software package, and runs the test on the patch, the output of the test including a vector of results from the test on the patch for each component of the test. Responsive to determining that the vector of results from the test on the patch matches a given vector corresponding to the given version of the software package, the application determines that the patch is usable to patch the given version of the software package.

20 Claims, 10 Drawing Sheets

100

(56)              References Cited

U.S. PATENT DOCUMENTS

| | | | |
|---|---|---|---|
| 2005/0091542 A1 | 4/2005 | Banzhof | |
| 2013/0167241 A1 | 6/2013 | Siman | |
| 2014/0173737 A1* | 6/2014 | Toback | G06F 21/57 |
| | | | 726/25 |
| 2019/0238593 A1* | 8/2019 | Larmuseau | H04L 63/20 |
| 2020/0242254 A1* | 7/2020 | Velur | G06F 21/577 |
| 2022/0222351 A1* | 7/2022 | Levin | G06F 8/71 |
| 2023/0185921 A1 | 6/2023 | Karas et al. | |
| 2023/0289448 A1* | 9/2023 | Kashani | H04L 9/0643 |
| 2024/0111512 A1* | 4/2024 | Liu | G06F 21/577 |
| 2024/0411886 A1* | 12/2024 | Sun | G06F 8/65 |
| 2024/0427902 A1* | 12/2024 | Achleitner | G06F 8/65 |
| 2025/0173443 A1* | 5/2025 | Ganz | G06F 21/577 |
| 2025/0284820 A1* | 9/2025 | Achleitner | G06F 21/577 |
| 2025/0384142 A1* | 12/2025 | Meszaros | G06F 21/577 |

FOREIGN PATENT DOCUMENTS

| | | | |
|---|---|---|---|
| CN | 117763559 B | * | 3/2025 |
| CN | 119397543 B | | 10/2025 |

OTHER PUBLICATIONS

Ben-Nun et al., "Neural Code Comprehension: A Learnable Representation of Code Semantics", arXiv:1806.07336v3, 2018 (Year: 2018).*

United States Office Action, U.S. Appl. No. 19/408,233, Feb. 17, 2026, nine pages.

\* cited by examiner

100

CVEs Patch Tool
130

Vulnerability Determination Module 210

Candidate Patch Generation Module 220

Validation Module 230

DAG Database 240

User Interface Module 250

Automatic Test Generation Module 260

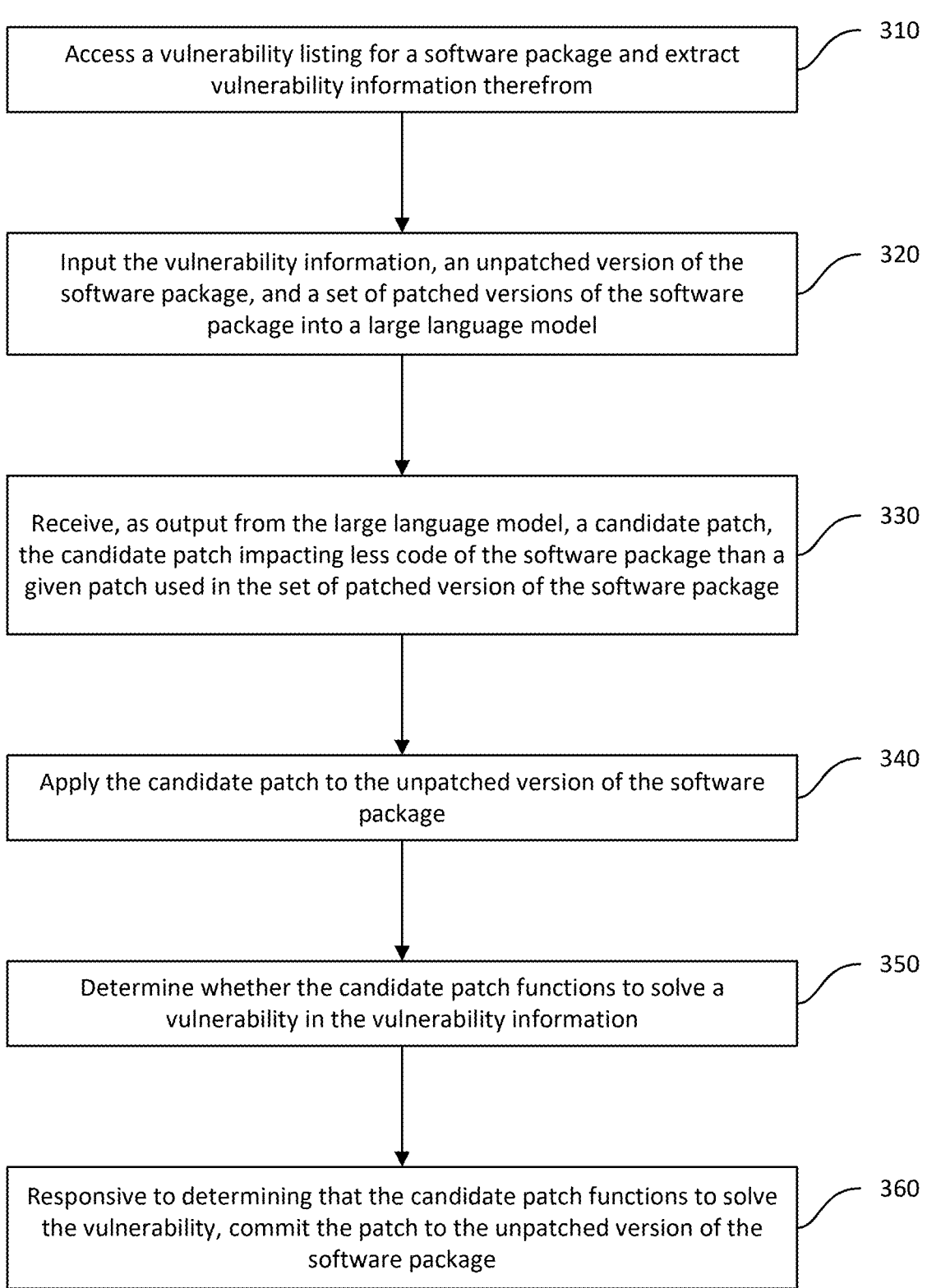

Access a vulnerability listing for a software package and extract vulnerability information therefrom ⟋ 310

Input the vulnerability information, an unpatched version of the software package, and a set of patched versions of the software package into a large language model ⟋ 320

Receive, as output from the large language model, a candidate patch, the candidate patch impacting less code of the software package than a given patch used in the set of patched version of the software package ⟋ 330

Apply the candidate patch to the unpatched version of the software package ⟋ 340

Determine whether the candidate patch functions to solve a vulnerability in the vulnerability information ⟋ 350

Responsive to determining that the candidate patch functions to solve the vulnerability, commit the patch to the unpatched version of the software package ⟋ 360

FIG. 3

Organization Name(s)     Has Affected Organizations e.g. ABC Corp     All

Figure 4A:
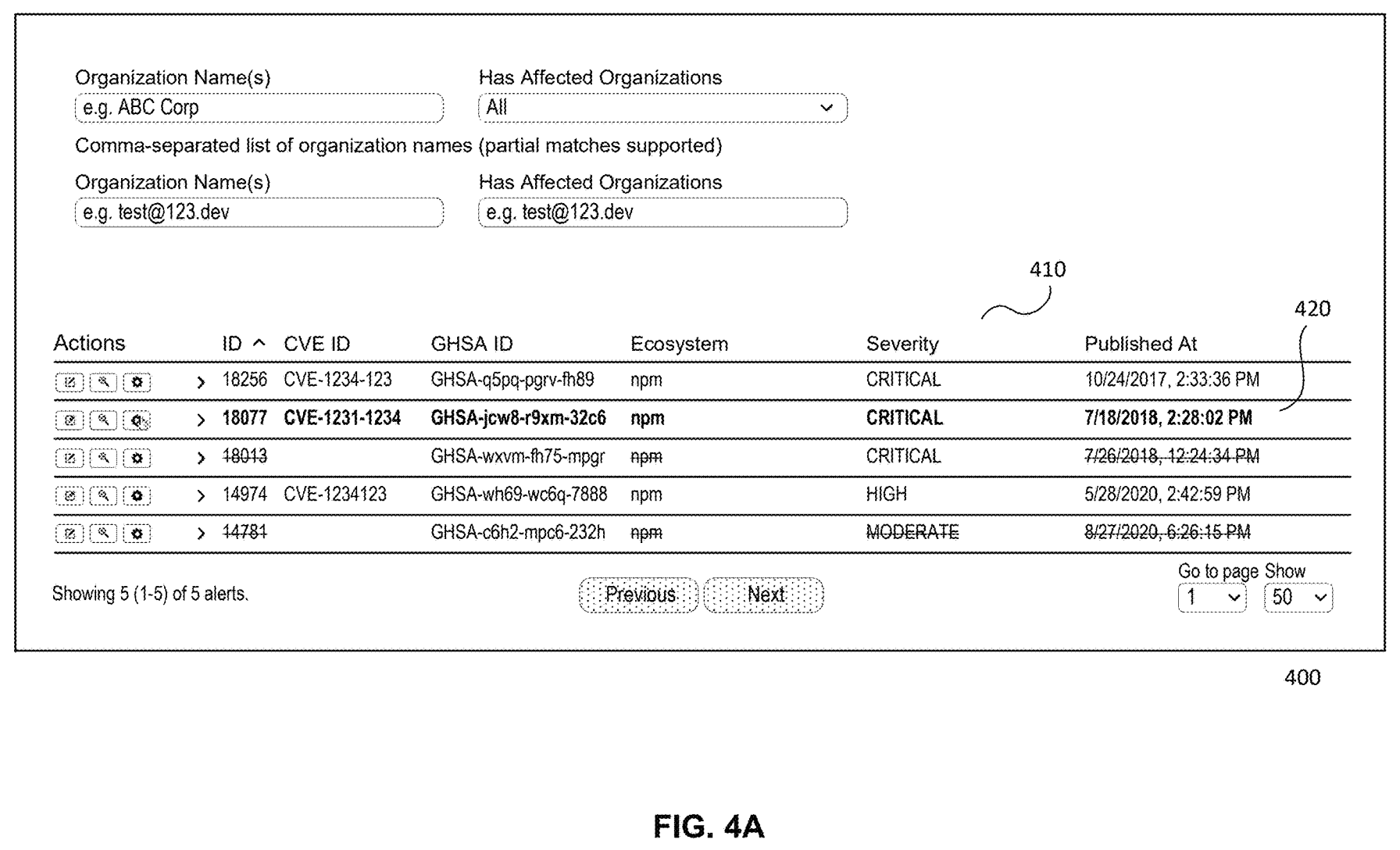

Comma-separated list of organization names (partial matches supported)

Organization Name(s)     Has Affected Organizations e.g. test@123.dev     e.g. test@123.dev

410

420

| Actions | | ID ∧ | CVE ID | GHSA ID | Ecosystem | Severity | Published At |
|---|---|---|---|---|---|---|---|
| | ∨ | 18256 | CVE-1234-123 | GHSA-q5pq-pgrv-fh89 | npm | CRITICAL | 10/24/2017, 2:33:36 PM |
| | ∨ | 18077 | CVE-1231-1234 | GHSA-jcw8-r9xm-32c6 | npm | CRITICAL | 7/18/2018, 2:28:02 PM |
| | ∨ | 18043 | | GHSA-wxvm-fh75-mpgr | npm | CRITICAL | 7/26/2018, 12:24:34 PM |
| | ∨ | 14974 | CVE-1234123 | GHSA-wh69-wc6q-7888 | npm | HIGH | 5/28/2020, 2:42:59 PM |
| | ∨ | 14784 | | GHSA-c6h2-mpc6-232h | npm | MODERATE | 8/27/2020, 6:26:15 PM |

Showing 5 (1-5) of 5 alerts.

Previous    Next

Go to page   Show

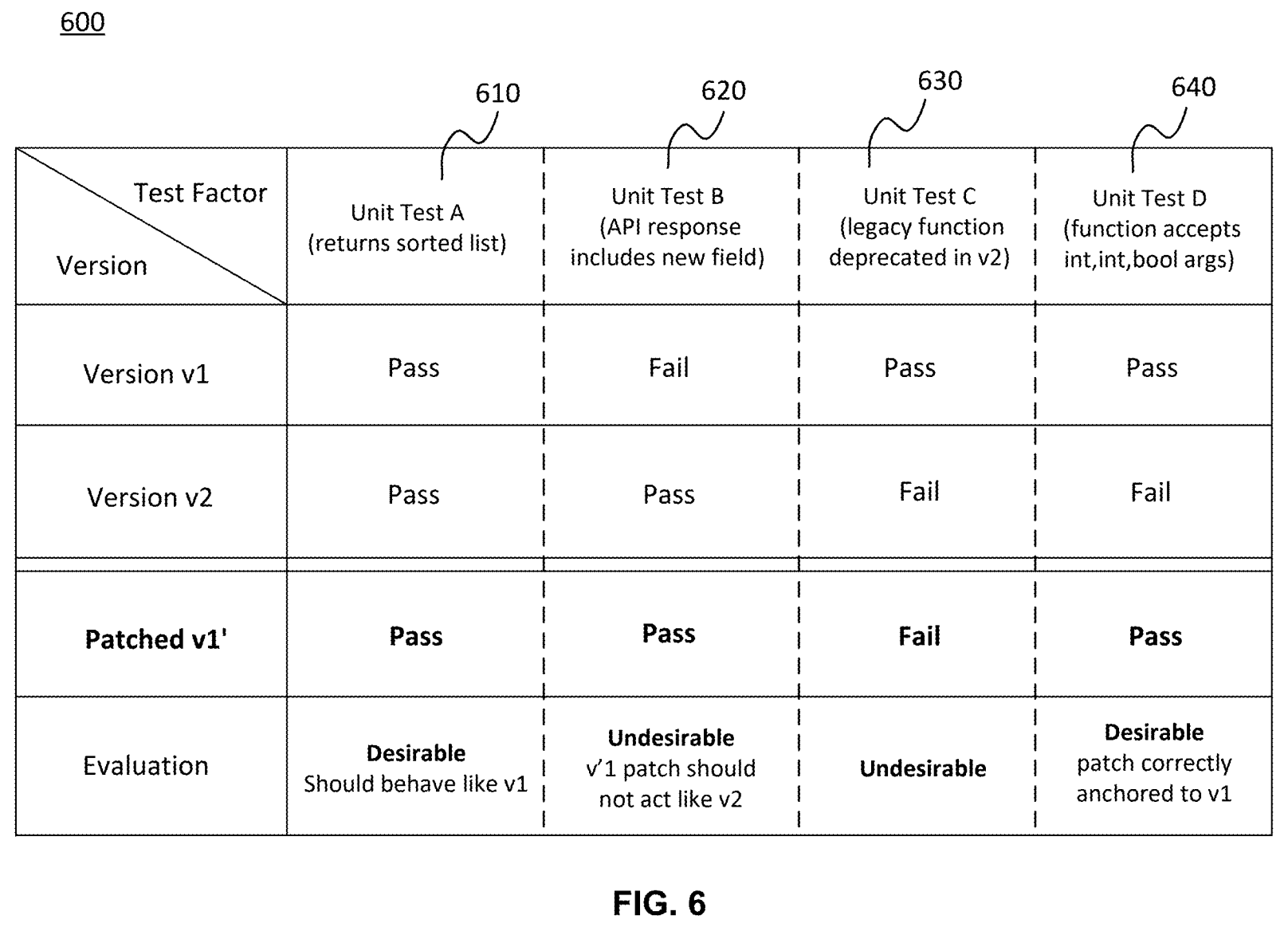

| Test Factor / Version | Unit Test A (returns sorted list) | Unit Test B (API response includes new field) | Unit Test C (legacy function deprecated in v2) | Unit Test D (function accepts int,int,bool args) |
|---|---|---|---|---|
| | 610 | 620 | 630 | 640 |
| Version v1 | Pass | Fail | Pass | Pass |
| Version v2 | Pass | Pass | Fail | Fail |
| Patched v1' | Pass | Pass | Fail | Pass |
| Evaluation | Desirable Should behave like v1 | Undesirable v1 patch should not act like v2 | Undesirable | Desirable patch correctly anchored to v1 |

FIG. 6

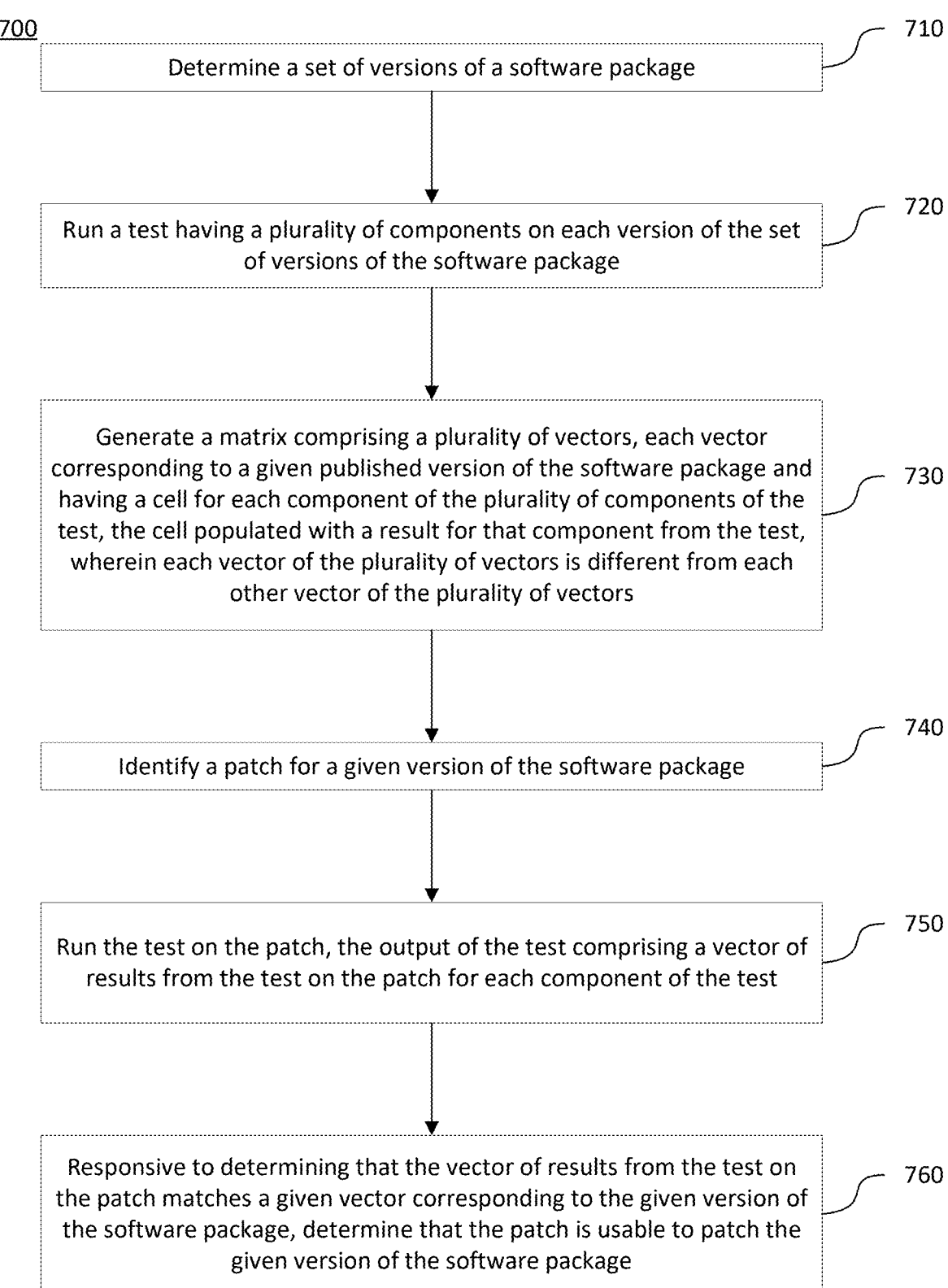

700

Determine a set of versions of a software package — 710

Run a test having a plurality of components on each version of the set of versions of the software package — 720

Generate a matrix comprising a plurality of vectors, each vector corresponding to a given published version of the software package and having a cell for each component of the plurality of components of the test, the cell populated with a result for that component from the test, wherein each vector of the plurality of vectors is different from each other vector of the plurality of vectors — 730

Identify a patch for a given version of the software package — 740

Run the test on the patch, the output of the test comprising a vector of results from the test on the patch for each component of the test — 750

Responsive to determining that the vector of results from the test on the patch matches a given vector corresponding to the given version of the software package, determine that the patch is usable to patch the given version of the software package — 760

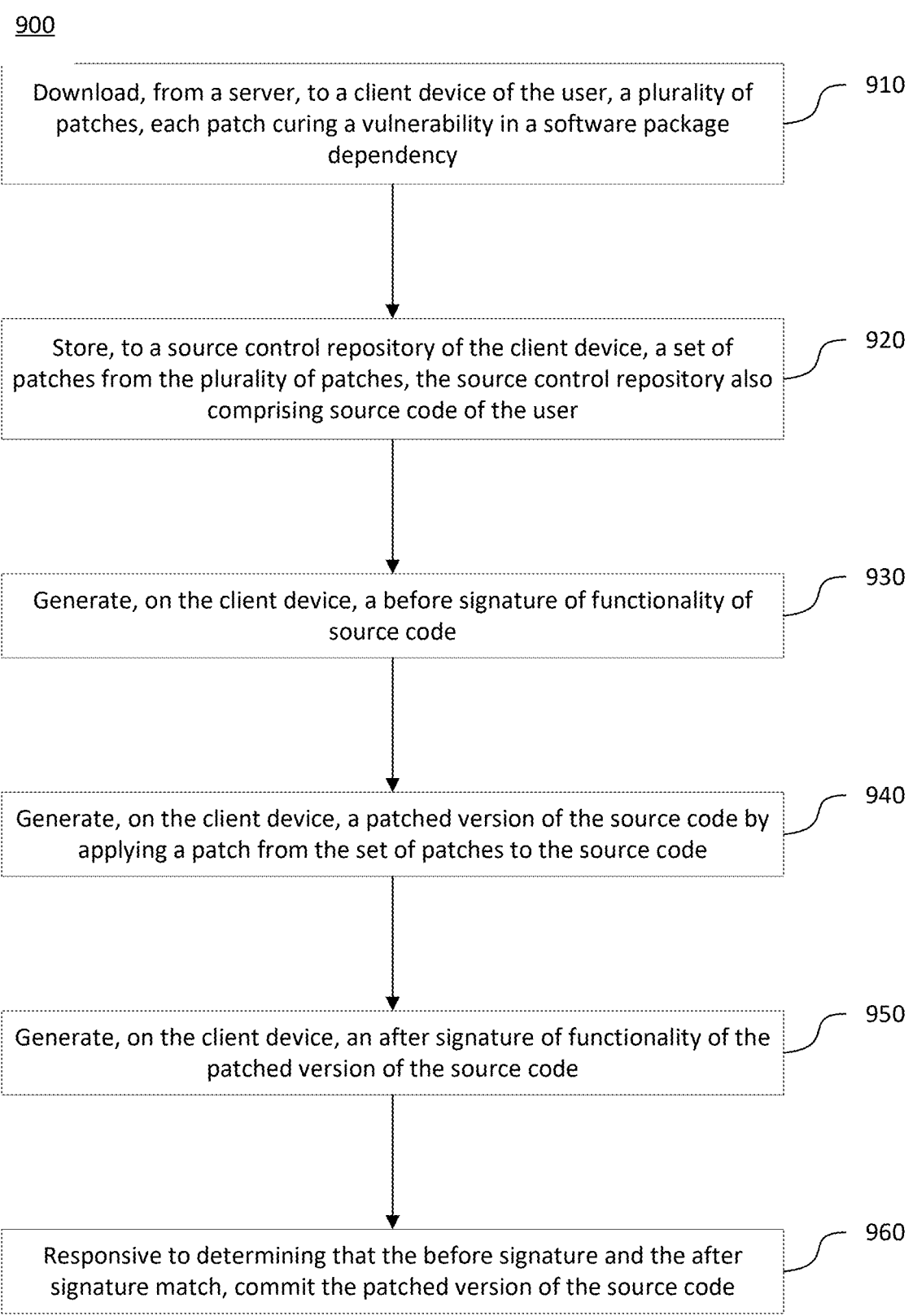

Download, from a server, to a client device of the user, a plurality of patches, each patch curing a vulnerability in a software package dependency — 910

Store, to a source control repository of the client device, a set of patches from the plurality of patches, the source control repository also comprising source code of the user — 920

Generate, on the client device, a before signature of functionality of source code — 930

Generate, on the client device, a patched version of the source code by applying a patch from the set of patches to the source code — 940

Generate, on the client device, an after signature of functionality of the patched version of the source code — 950

Responsive to determining that the before signature and the after signature match, commit the patched version of the source code — 960

FIG. 9

AUTOMATIC TEST GENERATION FOR IMPACT OF PATCHING SOFTWARE PACKAGE VULNERABILITIES

CROSS REFERENCE TO RELATED APPLICATIONS

This application claims the benefit of U.S. Provisional Application No. 63/884,017, filed on Sep. 18, 2025, the benefit of U.S. Provisional Application No. 63/869,804, filed on Aug. 25, 2025, and the benefit of U.S. Provisional Application No. 63/818,506, filed on Jun. 5, 2025, each of which are incorporated by reference in their entireties.

BACKGROUND

Tools for addressing vulnerabilities in software packages (e.g., malware hiding in dependencies within open source packages) are computationally expensive and may involve lag between a vulnerability being injected and discovered. Moreover, while these tools function to generate alerts to threats, users of the software packages are left to determine how to deal with the threats. Some databases, such as Common Vulnerabilities and Exposures (CVE) databases, track vulnerabilities and may even include patches for fixing the vulnerabilities. However, these patches often replace huge portions of code within the software package, resulting in an overwrite of crucial code that users may have already embedded into their modifications of the software package. Moreover, when a patch is selected for replacement of code, it may not be immediately clear as to whether implementation of the code has resulted in an overwrite of crucial code or has otherwise changed behavior of the software package in unintended ways.

Generally, providers of patches for patching dependencies require a persistent connection from source control repositories to the patch provider. This creates an additional failure point on deployment, where if a patch provider is down (e.g., at build time), then the build will fail and patches will not be able to be deployed, causing a vulnerability in a dependency to persist. Additionally, airgap requirements may be imposed where a developer is not permitted to expose a build to a third party patch provider.

SUMMARY

Systems and methods are disclosed herein for generating patches for detected vulnerabilities that are targeted just to impacted artifacts within vulnerable software packages. The system identifies artifacts by leveraging a large language model to identify portions of code addressed by existing vulnerability patches that would be triggered by the vulnerability, and iteratively merges existing patches into a new patch that surgically removes vulnerabilities with minimal changes to the original unpatched version.

In some aspects, systems and methods are disclosed herein that access a vulnerability listing for a software package and extracting vulnerability information therefrom. The system inputs the vulnerability information, an unpatched version of the software package, and a set of patched versions of the software package into a large language model, and receives, as output from the large language model, a candidate patch, the candidate patch impacting less code of the software package than a given patch used in the set of patched version of the software package. The system applies the candidate patch to the unpatched version of the software package, and determines whether the candidate patch functions to solve a vulnerability in the vulnerability information. Responsive to determining that the candidate patch functions to solve the vulnerability, the system commits the patch to the unpatched version of the software package.

Systems and methods are also disclosed herein for automatically testing whether a patch is effective or otherwise unduly changes behavior of a version of a software package by creating a test having a plurality of components and by running the software package without the patch and with the patch through the test. For each component, the system determines a result of the test. A vector of results forms a signature of software package behavior. Where a vector of results from a patched version of the software package matches the vector from the original software package version, it is determined that the patch is usable without changing behavior of the software package version.

In some aspects, the system determines a set of versions of a software package, and runs a test having a plurality of components on each version of the set of versions of the software package. The system generates a matrix including a plurality of vectors, each vector corresponding to a given published version of the software package and having a cell for each component of the plurality of components of the test, the cell populated with a result for that component from the test, where each vector of the plurality of vectors is different from each other vector of the plurality of vectors. The system identifies a patch for a given version of the software package, and runs the test on the patch, the output of the test comprising a vector of results from the test on the patch for each component of the test. Responsive to determining that the vector of results from the test on the patch matches a given vector corresponding to the given version of the software package, the system determines that the patch is usable to patch the given version of the software package.

In order to comply with airgap requirements and/or otherwise remove a dependency on network access to a patch provider (e.g., at build time, when deployment can be delayed if the patch provider is not accessible), systems and methods are also disclosed herein for installing patches and enabling commitment of those patches for vulnerable dependencies without network connectivity. A local agent downloads, from a server, to a client device of the user, a plurality of patches, each patch curing a vulnerability in a software package dependency. The agent stores, to a source control repository of the client device, a set of patches from the plurality of patches, the source control repository also including source code of the user. The agent generates a before signature of functionality of source code. The agent generates a patched version of the source code by applying a patch from the set of patches to the source code, and generates an after signature of functionality of the patched version of the source code. Responsive to determining that the before signature and the after signature match, the agent commits the patched version of the source code.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 3 illustrates a flowchart of an exemplary process for determining a candidate patch for common vulnerabilities and exposures, in accordance with an embodiment.

FIGS. 4A and 4B illustrate an exemplary user interface for generating and testing of CVE patches, including a graphical view of generated CVE patches, in accordance with an embodiment.

FIG. 6 illustrates an example of a patch validation matrix, in accordance with an embodiment.

FIG. 7 illustrates a flowchart of an exemplary process for automatically testing patches, in accordance with an embodiment.

FIG. 9 illustrates a flowchart of an exemplary process for automatically patching vulnerable dependencies entirely within a local environment, in accordance with an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
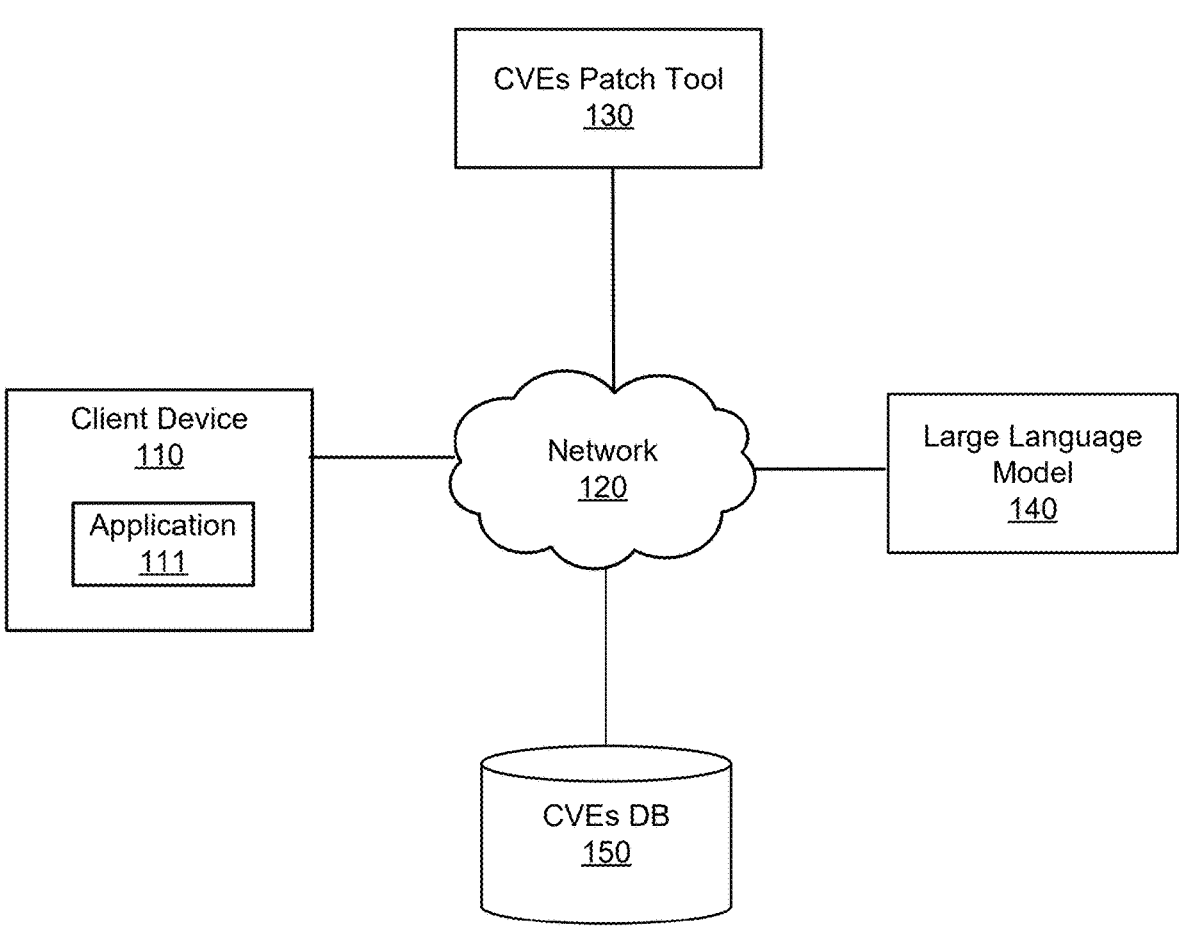
FIG. 1 illustrates one embodiment of a system environment for implementing a common vulnerabilities and exposures (CVEs) patch tool.

FIG. 1 illustrates one embodiment of a system environment for implementing a common vulnerabilities and exposures (CVEs) patch tool. As depicted in FIG. 1, environment 100 includes various devices, including client device 110, network 120, CVEs patch tool 130, large learning model 140, and a CVEs database 150. A tool, as used herein, is a collection of one or more cloud resources that together, perhaps in coordination with other entities such as application 111, form a client-facing tool. While the term CVEs patch tool is used, this disclosure is not limited to CVEs, and patching based on vulnerabilities detected from any source may be performed by CVEs patch tool.

Optionally, client device 110 may have application 111 installed thereon. Application 111 may provide interface between client device 110 and CVEs patch tool 130. Application 111 may monitor for a user (e.g., administrator or developer) accessing/or attempting to download a patch or apply a patch.

Application 111 may be a stand-alone application installed on client device 110, or may be accessed by way of a secondary application, such as a browser application. Any activity described herein with respect to CVEs patch tool 130 may be performed wholly or in part (e.g., by distributed processing) by application 111. That is, while activity is primarily described as performed in the cloud by CVEs patch tool 130, this is merely for convenience, and all of the same activity may be performed wholly or partially locally to client device 110 by application 111.

In some embodiments, while patches may be generated on the cloud, commitment of patches may not require a persistent connection between client device 110 and CVEs patch tool 130. As will be discussed with reference to at least FIGS. 8-9 below, patches may be downloaded to client device 110 and stored at a same source control system that is used by a user of client device 110 to manage the rest of their code, thereby requiring no extra network connectivity to access and commit patch updates.

Network 120 facilitates transmission of data between client device 110, CVEs patch tool 130, and large language model 140, as well as any other entity with which any entity of environment 100 communicates. Network 120 may be any data conduit, including the Internet, short-range communications, a local area network, wireless communication, cell tower-based communications, or any other communications.

Common vulnerability exposures (CVEs) patch tool 130 performs a series of operations to facilitate detection, generation, and deployment of security patches for open-source software packages with vulnerabilities. CVEs patch tool 130 analyzes CVE data and associated source code versions to extract information that needs to be fixed and identify impacted regions within the collection of source codes. CVEs patch tool 130 may generate candidate patches that remediate the identified vulnerabilities while minimizing disruption to existing software modifications. CVEs patch tool 130 may apply candidate patches across multiple affected versions of the software packages including earlier releases, through backporting operations. Each candidate patch undergoes a validation process using automated artificial intelligence test, code analysis and/or human review. CVEs patch tool 130 may automatically generate tests for validating patch efficacy prior to commitment. CVEs patch tool 130 may utilize large language model 140, which may be implemented as an external service (e.g., a third-party model such as one provided by OpenAI) or as a model deployed locally within the system.

In some embodiments, CVEs patch tool 130 may provide a user interface that allows the users to browse vulnerability information, review patch content and download validated patches for deployment. In another embodiment, CVEs patch tool 130 may track a lifecycle of patch development (e.g., spanning generation, validation, application, refinement and etc.) within a graph-based data structure to enable traceability and improvement. Further details regarding the components and operation of CVEs patch tool 130 are discussed later in accordance with FIG. 2

Large language model (LLM) 140 generates candidate patches for software packages with vulnerability. LLM 140 receives, as input, vulnerability information such as CVE descriptions and metadata, the source code of an unpatched version of the software package, and one or more patched versions of the corresponding package. Based on these inputs, LLM 140 identifies the regions of source code with vulnerability and generates a candidate patch to remediate the issue.

In one or more embodiments, large language models are trained on a large corpus of training data to generate outputs for the NLP tasks. An LLM may be trained on massive amounts of text data, often involving billions of words or text units. The large amount of training data from various data sources allows the LLM to generate outputs for many inference tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Because an LLM has significant parameter size and the amount of computational power for inference or training the LLM is high, the LLM may be deployed on an infrastructure configured with, for example, supercomputers that provide enhanced computing capability (e.g., graphic processor units (GPUs) for training or deploying deep neural network models. In one or more instances, the LLM may be trained and hosted on a cloud infrastructure service. The LLM may be trained by the online system 140 or entities/systems different from the online system 140. An LLM may be trained on a large amount of data from various data sources. For example, the data sources include websites, articles, posts on the web, and the like. From this massive amount of data coupled with the computing power of LLMs, the LLM is able to perform various inference tasks and synthesize and formulate output responses based on information extracted from the training data.

In one or more embodiments, when the machine-learning model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In another embodiment, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

Common vulnerability exposures (CVEs) database 150 collects and stores vulnerability data from publicly available sources, such as the National Vulnerability Database (NVD), GitHub Security Advisories, and other third-party CVE feeds. The vulnerability data may include, for example, CVE identifiers, description of vulnerabilities, severity scores (e.g., CVSS), affected software package names, and versions, patch references and associated vulnerability metadata (e.g., CWE classifications, advisory links, and publication date, and etc.) Moreover, CVE database 150 retrieves and stores package metadata from language-specific package registries such as version history release dates, dependency information, or distribution tags that correspond to software packages published from platforms such as npm and PyPI that support tracking and indexing of vulnerabilities across open-source software ecosystems. CVE database 150 interfaces with CVE patch tool 130 via network 120 to provide vulnerability listings that correspond to a specific software package which allows CVE patch tool 130 to perform downstream analysis, backporting and patch generation operations.

While CVEs typically follow a standardized data structure, CVEs patch tool 130 may also parse other data structures obtained from other data sources (e.g., third-party feeds) that have the requisite information necessary to form a patch. The information may include, for instance, affected package versions, vulnerability descriptions, CWE classifications, and patch references, allowing the system to adapt to a broader range of vulnerability data formats.

Common Vulnerabilities and Exposures Tool Particulars

Figure 2:
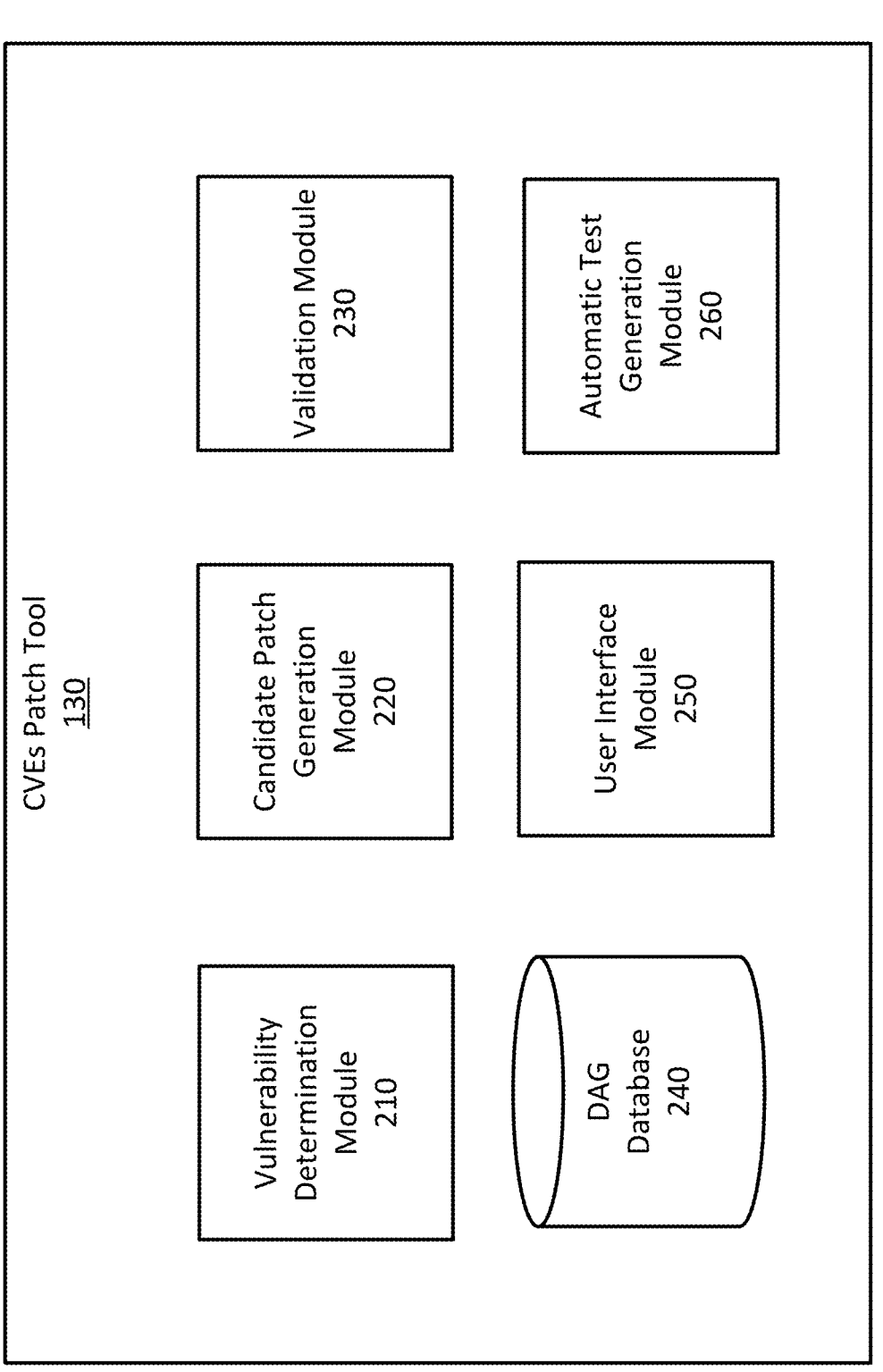
FIG. 2 illustrates a block diagram showing exemplary modules and databases used by the CVEs patch tool, in accordance with an embodiment.

FIG. 2 illustrates a block diagram of the system environment the common vulnerabilities and exposures (CVEs) patch tool 130. As depicted in FIG. 1, CVEs patch tool 130 includes various modules, including vulnerability determination module 210, candidate patch generation module 220, validation module 230, directed acyclic graph (DAG) database 240 user interface module 250, and automatic test generation module 260.

Vulnerability determination module 210 accesses CVE listings published by external sources such as GitHub Security Advisories, the National Vulnerability Database (NVD), and MITRE from CVEs database 150. Vulnerability determination module 210 retrieves and analyzes vulnerability descriptions, metadata, and version information to determine the earliest version of a software package in which the vulnerability is resolved and the latest version that remains affected for each CVE data. For example, the vulnerability descriptions may vary in detail, some CVE data may include comprehensive explanations, reproduction steps, and references to and/or copies of existing patches, while others may include a brief statement indicating that a fix was applied. In some scenarios, the vulnerability descriptions may include incorrect or overly broad data, such as references to package versions that are not impacted by a vulnerability (e.g., where other package versions that are later or earlier than the non-impacted versions are impacted), such as references to packages that are purportedly impacted by a vulnerability but are not impacted at all, and so on. In some scenarios, an impacted package may not have any corresponding vulnerability description (e.g., because the package is not listed in CVE data).

The process of vulnerability determination may be triggered in various ways. In some cases, it may be initiated automatically in response to the detection of a newly published vulnerability affecting a software package. In other cases, the system may begin the process based on an explicit request from a user of client device 110 seeking to analyze a particular software version or CVE.

Vulnerability determination module 210 retrieves the corresponding source code for these two versions and compares them to generate a diff, which captures changes introduced to address vulnerability. In some embodiments, the generation of a diff involves comparing two versions of file or source code to identify changes between them. Typically, it begins with matching corresponding files and performing a line-by-line analysis to detect insertions, deletions, or modifications. Vulnerability determination module 210 may deploy a use of standard diff algorithms such as Myers' algorithm. The output is structured into segments, which captures localized changes along with their surrounding context.

For example, considering a Python function in version 1 that lacks input validation:

```
#Version 1
    def sample process (data):
        return data.strip( )
```
In version 1.1 the user introduces a simple check to ensure that the input is not None:
```
#Version 1.1
    def sample process (data):
        if data is None:
            return None
        return data.strip( )
```
The diff output for comparing these two versions may highlight the newly added if clause.

Based on the generated diff, vulnerability determination module 210 identifies the portions of source code that were modified to fix the vulnerability. This includes locating specific functions, file paths, and line numbers, or offsets that differ between the affected and fixed versions. The affected regions correspond to source code segments that implement the vulnerable logic (e.g. function calls related to insecure data processing, improper input handling, or mis-configured security controls).

Candidate patch generation module 220 generates candidate patches for one or more software packages affected by a vulnerability. Candidate patch generation module 220 utilizes a large language model (LLM) to generate a set of potential candidate patches, where each patch reflects a difference between the unpatched version of the software package and one of the patched versions from a set of patched versions. The unpatched version refers to a software package version containing a vulnerability (e.g., the latest version), and the set of patched versions refers to a collection including one version or multiple versions of the same software package in which the vulnerability has been resolved, such as the earliest version and any subsequent versions verified to include the fix. In some embodiments, the set of patched versions comprises patched versions of the same version of the software package in which the vulnerability has been resolved.

In some embodiments, a single candidate patch generated by candidate patch generation module 220 may be applicable to multiple versions of the software package. These versions may vary in terms of dependencies, code structure, or metadata, the core vulnerability and its corresponding fix may remain consistent among them. In some embodiments, different versions of the software package may require different patches to be generated in order to address respective manifestations of the vulnerability.

Candidate patch generation module 220 retrieves a diff between the unpatched version and a selected patched version from vulnerability determination module 210. The diff herein includes the specific code changes (e.g., modified functions), files and line numbers that were introduced to fix the vulnerability. Candidate patch generation module 220 also receives vulnerability descriptions and associated metadata (e.g., CWEs, version identifiers, or patch references), which may vary in detail and are used to support contextual enrichment of LLM input. Candidate patch generation module 220 constructs a prompt for the LLM using the diff as an input, along with the vulnerability information and corresponding metadata. The input to the prompt may be refined prior to constructing the prompt to exclude unrelated edits that are not related to the vulnerability, which otherwise may cause confusion, by selecting only the specific lines or codes that are directly responsible for the fix or referencing commit hashes.

LLM 140 may responsively generate a set of potential candidate patches, where each patch reflects a possible fix derived from the code difference between the unpatched version and the selected patched version. Each candidate patch is configured to impact less source code than a given patch (e.g., the original fix applied by developers to resolve the vulnerability) used in one of the patched versions of the software package. For example, a full developer patch may include unrelated updates such as formatting changes, refac-toring, or additional functionality not directly related to the vulnerability fix. In some embodiments, candidate patch generation module 220 merges the set of potential patches into a merged patch that consolidates the most relevant changes across the generated candidates.

Validation module 230 receives a candidate patch from candidate patch generation module 220 and evaluates whether the patch successfully addresses the vulnerability. Validation module 230 applies a candidate patch to the unpatched version of the software package and performs a series of automated AI and/or manual validation processes. The validation process may include syntactic validation (e.g., detecting syntax errors), logical validation (e.g., iden-tifying programming bugs), and semantic validation (e.g., determining whether the patch resolves the vulnerability). Validation module 230 may run automated plausibility checks, including static and dynamic analysis, supported by AI-based review, manual code review, or unit testing. Vali-dation module 230 determines whether the candidate patch functions to solve the vulnerability described in the vulner-ability information, and, if successful, may commit the patch to the unpatched version of the software package or other-wise designate the patch as ready (e.g., for commitment based on instruction by a user). If the patch fails validation, the system combines the patch, validation feedback, and optionally human instructions to produce a refined version, using large language model.

In some embodiments, validation module 230 may deploy an iterative merge and validate loop. Validation module 230 may consolidate multiple patch candidates and their valida-tion outcomes to generate a refined patch that applies cleanly and satisfies all criteria. This process may iterate until a high-confidence patch is achieved. For example, each can-didate patch is applied (e.g., in a test environment) to the unpatched version of the software package, and validation outputs are recorded. The outcomes may take the form of pass/fail results along with test coverage metrics indicating the extent to which the patched code was run during testing, or reports of syntax/logic issues. Validation module 230 then may use a scoring or heuristic-based selection to rank and merge the best-performing patches.

Responsive to determining that the patch is validated, validation module 230 may produce a validation report and designates the candidate patch as ready for deployment or publication. During the validation process, validation mod-ule 230 may review previously saved logs of patch attempts captured in a directed acyclic graph (DAG) database 240 to inform refinement decision and avoid redundant patch fail-ures. The details of the directed acrylic graph are further described below. In some embodiments, responsive to deter-mining that the patch is validated, validation module 230 may automatically commit the patch to the vulnerable version to which it corresponds.

DAG database 240 maintains a directed acyclic graph representing the patch development of candidate patches within the system. Each node in the DAG corresponds to a potential patch, merged patch, or validated candidate patch, and each edge represents a progression through which the candidate patch was derived. The DAG structure enables full traceability of patch development, capturing the history of patching workflows. This keeping of record allows a human or AI agent to go through and initiate the process of creating a new candidate patch or refining a candidate patch. In some embodiments, the DAG may serve as a training foundation for reinforcement learning, which allows the model to explore, evaluate, and refine patching strategies for future patch generation attempts by traversing historical patch attempts and outcomes.

User interface module 250 provides a web-based platform for human users to interact with the CVEs patch tool 150. Through this interface, users can view published CVEs, inspect extracted vulnerability information, and initiate candidate patch extraction. Further, user interface module 250 may allow users to review, edit, and provide feedback on candidate patches, as well as monitor the progress of validation workflows. In some embodiments, for approved patches, user interface module 250 may generate for display download options for the committed candidate patches, which enable users to retrieve validated patches and apply them to their local software environments. In some embodiments, approved patches may be automatically downloaded to a user's source control system on client device 110, and user interface module 250 may enable application of the approved patches without a need for network connectivity.

In some embodiments, vulnerability determination module 210 may, after identifying a vulnerability pattern for a given version of a software package (e.g., after identifying a diff as described in the foregoing), may automatically determine whether the vulnerability pattern exists in other versions of the software package. For example, a software package having versions V1 through V5 may be listed in CVEs DB 150 as having a vulnerability in version V5 without addressing V1-V4, or may just generally indicate that the software package has a vulnerability (without addressing any of V1-V5 specifically). Vulnerability determination module 210 may determine (e.g., for software package versions that are not addressed by the CVEs DB entry, or without regard to the CVEs DB entry in case the entry has incorrect information) whether various ones of the other versions have the same vulnerability pattern. Where these versions have the same vulnerability pattern, CVEs patch tool 130 may determine that the patch created for the given version is also applicable to the other identified versions. In some embodiments, CVEs patch tool 130 may run validation module 230 against the other versions in order to validate that the same patch can safely be applied to the other identified versions. For versions where the patch is applicable (and optionally, for versions where the patch is validated), the patch may be automatically committed or may be added as an option for commitment based on input from a user.

FIG. 3 illustrates a flowchart of an exemplary process for determining a candidate patch for common vulnerabilities and exposures, in accordance with an embodiment. As depicted in FIG. 3, process 300 may be executed by one or more processors executing instructions to perform activity described with respect to modules of CVEs patch tool 130. Process 700 begins with CVEs patch tool 130 accessing 310 a vulnerability listing for a software package and extracting vulnerability information therefrom (e.g., using vulnerability determination module 210). CVEs patch tool 130 inputs 320 the vulnerability information, an unpatched version of the software package, and a set of patched versions of the software package into a large language model, and receives 330, as output from the large language model, a candidate patch, the candidate patch impacting less code of the software package than a given patch used in the set of patched versions of the software package (e.g., using candidate patch generation module 220).

CVEs patch tool 130 applies 340 the candidate patch to the unpatched version of the software package, and determines 350 whether the candidate patch functions to solve a vulnerability in the vulnerability information (e.g., using validation module 230). CVEs patch tool 130, responsive to determining that the candidate patch functions to solve the vulnerability, commits 360 the patch to the unpatched version of the software package (e.g., using user interface module 250 and/or automatic commitment of the patch).

Figure 4B:
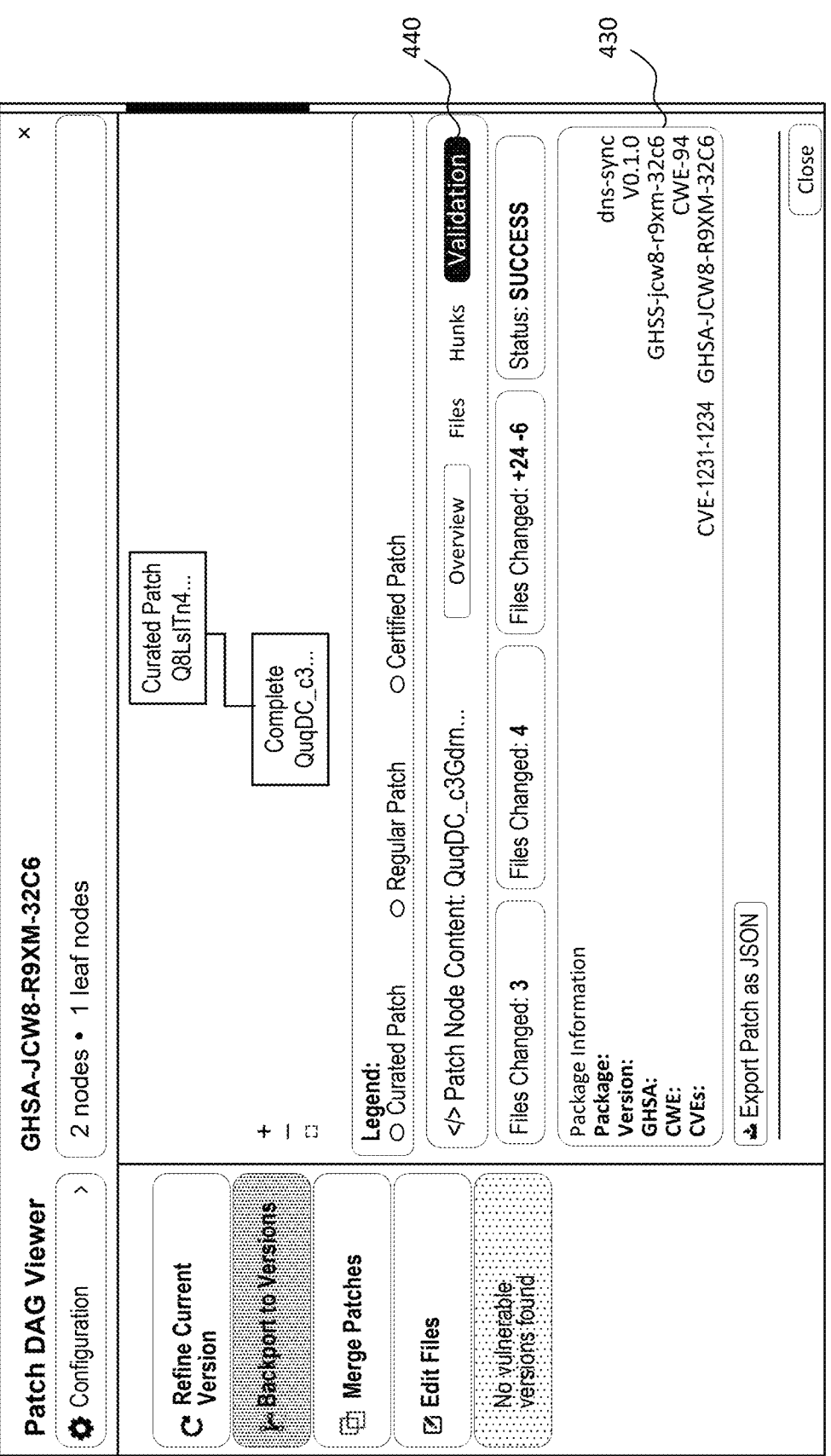

FIGS. 4A and 4B illustrate an exemplary user interface for generation, inspection, and validation of CVE patches, including a graphical view of patch development. As shown in FIG. 4A, the user interface 400 presents a list 410 of known vulnerabilities with associated patch information. Each row includes identifiers such as a CVE ID and corresponding GHSA ID (GitHub Security Advisory identifier), as well as metadata including, for example, the ecosystem, severity level, and publication date. A user may filter or search the list (e.g., as depicted, by organization name or affected packages, though any filter may be used), and select a particular entry 420 to open a detailed patch view.

FIG. 4B illustrates the detailed patch interface that is displayed when a user selects a CVE entry from FIG. 4A. The patch interface includes a directed acyclic graph (DAG) view showing the lineage of generated patches, such as curated patches, merged patches, or complete patch nodes. The DAG view provides a user interface depicting how candidate patches are refined into certified outputs, where versions of candidate patches are created from prior versions, and directed edges link nodes on the DAG to reflect this evolution of patch creation. The user interface further provides controls for refining the current version, applying a patch to additional vulnerable versions, merging patches from different advisories, directly editing files to create new patch variations, or exporting of the patch as a JSON file for downstream integration or deployment.

Furthermore, the user interface includes a validation component 440 for running automated validation tests on the selected patch. Patch details such as the number of files changed, added or removed lines, and overall validation status may be displayed to the user. Metadata 430 describing the package, version, CVE identifiers, and GHSA references is also provided for context. An exemplary additional validation process, beyond that discussed in the foregoing, is further discussed in conjunction with automatic test generation module 260 and FIGS. 5-7.

Automatic Patch Test Generation

Figure 5:
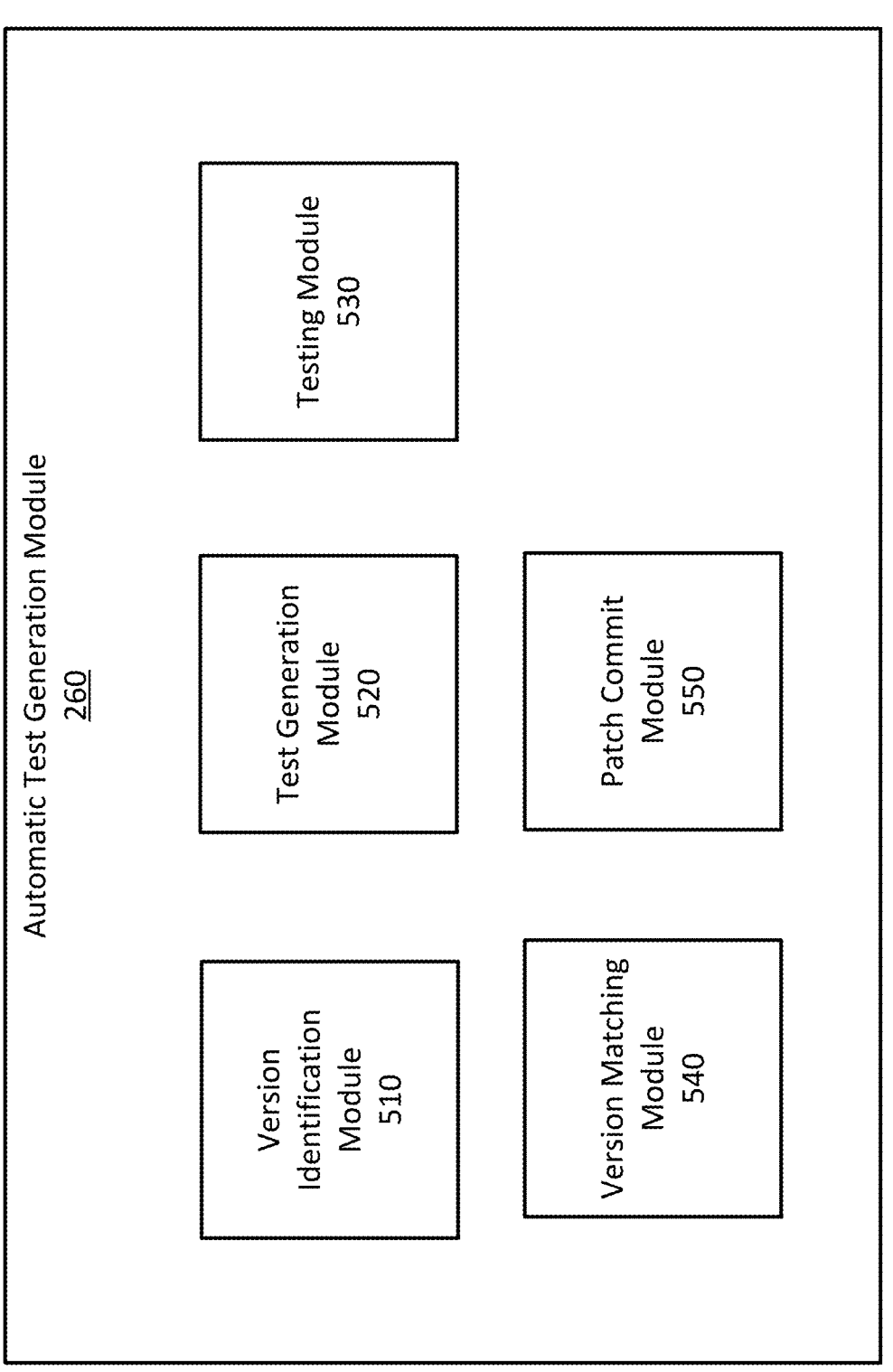
FIG. 5 illustrates a block diagram showing exemplary modules and databases used in connection with automatic test generation, in accordance with an embodiment.

FIG. 5 illustrates a block diagram showing exemplary modules and databases used in connection with automatic test generation, in accordance with an embodiment. As depicted in FIG. 5, automatic test generation module 260 includes version identification module 510, test generation module 520, testing module 530, version matching module 540, and patch commit module 550. The modules depicted with respect to FIG. 5 are merely exemplary, and fewer or additional modules may be used to achieve the functionality disclosed herein.

Automatic test generation module 260 generates validation tests configured to evaluate functional equivalence between an original software package and a patched software package. Automatic test generation module 260 applies the same set of test components across multiple versions of the package, and each test component exercises a particular behavior of the package, such as verifying an API schema, invoking a legacy method, or checking default parameter values. The outcome of each component is recorded as a result, forming a vector that represents the behavioral profile of that version. Automatic test generation module 260 is depicted as a part of CVEs patch tool 130 for convenience, but may in some embodiments be its own standalone tool separate from CVEs patch tool 130. Automatic test generation module 260 may be used to validate that a patch (e.g., generated using CVEs patch tool 130) does not change the underlying functionality of a software package version, thereby confirming that vulnerabilities are treated by the patch without compromising useful developer code.

In some embodiments, in connection with generating the validation tests, version identification module 510 determines a set of versions of a software package for evaluation. The set may include a baseline original version (e.g., version v1), and one or more patched instances derived from the baseline original version (e.g., patched version v1', patched version v1", etc.). The set may include a plurality of baseline original versions of a software package, optionally along with one or more patched versions of those baseline versions. Version identification module 510 may determine the versions from any repository of patched versions, such as by referencing a data structure showing patched versions generated by CVEs patch tool 130 for a given baseline original version. Additionally or alternatively, the versions may be identified from versions published in CVEs DB 150.

After the set of versions is determined, test generation module 520 may generate a test set, the test set having a plurality of tests, each of those tests being a component of the test set. Each component may target a specific behavioral aspect of the software package being tested. The purpose of the test set is to use a vector of the results of the test set as applied to a given version of a software package as a signature that uniquely identifies execution of the given version of the software package. That is, a properly constructed test set would, for each version of the software package, have a results vector that is unique relative to each other version of the software package. In this way, when an patch is applied to a given version, it is possible not just to detect whether a patch successfully cures a vulnerability, but also to determine whether the patch changes behavior of the corresponding original baseline version. That is, where v1 has a certain behavior, v2 has a difference in that certain behavior, and applying a patch to v1 causes the vulnerability to disappear, but causes the difference to occur where patched v1 acts like v2 for that behavior, automatic test generation module 260 is able to detect a problem with the patch where behavior is undesirably changed notwithstanding the cure to the vulnerability. That is, when committing patches, the goal is not to debug a given version (e.g., improve v1 to look more like v2 where a bug is fixed), but rather is to ensure that behavior of the given version is maintained.

Test generation module 520 generates the vector of tests that form a test set for a given software package. In some embodiments, test generation module 520 may generate the vector of tests by prompting an LLM with each version of the software package and a request to identify behavioral components of each version and tests to determine whether those behavioral components are maintained. In some embodiments, test generation module 520 may use a classifier (e.g., a machine learning model trained with training data of snippets of test code as labeled by behavior), where software package versions are input into the classifier, and a plurality of behavior classifications are output by the classifier. A mapping table may be accessed that maps pre-stored tests to classifications, and the test set for each version may be populated using pre-stored tests that match behavior classifications of each version. In some embodiments, tests may be extracted from software packages directly, where tests for the software packages are stored in association with the software packages themselves.

Test generation module 520 may determine that a given test set is suitable by running the test across all unpatched versions of the software package, and determining whether each results vector for each software package version is unique relative to each other version. Responsive to detecting results vectors that are not unique, test generation module 520 may modify the test set (e.g., by prompting the LLM or by swapping pre-stored tests for other matching pre-stored tests) and re-running the tests on the unpatched versions until all test vectors are unique.

Testing module 530 may, for each software package version in the set of versions of the software package for evaluation, apply the test set. Testing module 530 may apply identical inputs under controlled conditions across every version, ensuring that any differences in results come from the versions themselves. Testing module 530 may generate, from the results of the test, a validation matrix comprising a plurality of vectors, where each vector corresponds to a given version of the software package and includes a cell for each component of the test set. Each cell is populated with the result for that test component when executed on the corresponding version. Because different versions behave differently, their vectors are expected to differ. For example, a vector corresponding to version v1 may record a "fail" cell for an added field check, whereas the vector for version v2 records "pass" for the same component. The validation matrix therefore provides a view of how versions differ across the same test set.

Testing module 530 also tests a patch intended for a given version of the software package. The patch may be a candidate patch generated by candidate patch generation module 220, a merged patch, or a manually authored patch. Testing module 530 takes a version where the patch is committed to the baseline version by compiling or rebuilding the software with the patch integrated (e.g., using CVEs patch tool 130, as described in the foregoing). The patched version is included as an additional row in the validation matrix to enable direct comparison against the baseline version and other related releases.

In some embodiments, test vectors for known versions of a software package may be generated prior to a need to test a patched version (e.g., as versions become known to CVEs patch tool 130, or otherwise in the course of time prior to a vulnerability being detected). In some embodiments, test vectors may be generated responsive to detecting a vulnerability in a given version of the software package. In some embodiments, testing of the patched version may occur at a same time as testing of the known versions, and in other embodiments testing of the patched version may occur responsive to a patch being generated for a given version, where the vector of test results is added to a pre-existing matrix.

In any case, automatic test generation module 260 executes the same plurality of test components from the test set on the patched version. The output of this execution forms a new vector of results, with one cell per test component, structured identically to the vectors of published versions. By maintaining the same input test factors across all versions, the system ensures that the patched version's result vector can be directly aligned with that of version v1, and any other included versions of the software package.

Version matching module 540 then compares the patch result vector to the vectors corresponding to published versions in the validation matrix. Responsive to determining that the patch result vector matches the vector corresponding to the intended baseline version (e.g., v1), version matching module 540 determines that the patch is usable, as it preserves the functional equivalence of the baseline. In such cases, patch commit module 550 may automatically commit the patch, or may enable a user interface option for a user to commit the patch (e.g., as discussed above with respect to FIG. 2).

In some embodiments, responsive to determining that the patch result vector does not match the vector corresponding to the intended baseline version (e.g., v1), version matching module 540 may signal to testing module 530 to await a refined patch (e.g., to be generated by CVEs patching tool 130) and repeat validation until the patch conforms to the expected baseline behavior. In some embodiments, responsive to determining that the patch result vector does not match the vector corresponding to the intended baseline version, the system determines that the patch is not usable. In some embodiments, version matching module 540 may determine a portion of the patch that is causing the patch to not be usable (e.g., by identifying a portion of code corresponding to a mis-matching cell of the patch result vector relative to the baseline vector, and/or by prompting a large language model to identify why the mismatch is occurring). Version matching module 540 may automatically address the mis-match through a code change (or may prompt a user to manually address the issue), and may then run a new test and determine whether the new patch result vector matches or not, and may iterate until the patch is usable (whereafter the patch may be committed in any manner disclosed herein).

FIG. 6 illustrates an example of a patch validation matrix. As shown in FIG. 6, the collection of result vectors across versions is organized into a validation matrix 600. Each column of the matrix corresponds to a test factor 610, 620, 630 and 640, and each row corresponds to a particular version of the software package under evaluation. Version v1 represents the original release of the software package, version v2 represents a subsequent release, and patched version v1' represents the patched instance of the original release. The final row indicates the evaluation result of comparison results of the patched version against the original release. This is merely exemplary, and any number of versions may be included in validation matrix 600.

Unit test A 610 verifies a sorting function. Both version v1 and version v2 correctly returns sorted results, and the patched version v1' also passes. Thus, the expected outcome is that the patched version behaves consistently with v1, which in this case is satisfied. Unit Test B 620 evaluates the schema of an API response. Version v1 returns {id, name} without a status field, while version v2 extends the response to {id, name, status}. The patched version v1' incorrectly produces the extended schema, aligning its behavior with version v2. Even though the patch has potentially corrected a bug of v1, this evaluation result is undesirable, as the patch has introduced later-version functionality that should not be present in the baseline.

Unit Test C 630 checks for availability of a legacy function that remains in version v1 but is removed in version v2. The patched version v1' fails the test, producing the same result as version v2. This indicates that the patch removed prior-version functionality, which is undesirable because applications depending on version 1 behavior may fail. In some cases, automatic test generation module 260 may confirm that a patched version has preserved baseline behavior while excluding functionality introduced in subsequent releases. For example, Unit Test D 640 may verify a feature unique to version 1 that was removed or substantially altered in version 2. The patched version v1' correctly continues to support the version 1-specific behavior, showing that the patch remains anchored to the baseline and has not adopted later-version changes.

FIG. 7 illustrates a flowchart of an exemplary process for automatically testing patches, in accordance with an embodiment. As depicted in FIG. 7, process 700 may be executed by one or more processors executing instructions to perform activity described with respect to modules of automatic test generation module 260 (and/or any other modules of CVEs patch tool 130). Process 700 begins with automatic test generation module 260 determining 710 a set of versions of a software package (e.g., using version identification module 510). Automatic test generation module 260 runs 720 a test having a plurality of components on each version of the set of versions of the software package (e.g., generated using test generation module 520), and generates 730 a matrix comprising a plurality of vectors, each vector corresponding to a given published version of the software package and having a cell for each component of the plurality of components of the test, the cell populated with a result for that component from the test, where each vector of the plurality of vectors is different from each other vector of the plurality of vectors (e.g., using testing module 530).

Automatic test generation module 260 identifies 740 a patch for a given version of the software package (e.g., from CVEs DB 150 or generated by CVEs patch tool 130), and runs 750 the test on the patch, the output of the test comprising a vector of results from the test on the patch for each component of the test (e.g., using testing module 530). Responsive to determining that the vector of results from the test on the patch matches a given vector corresponding to the given version of the software package (e.g., using version matching module 540), automatic test generation module 260 determines 760 that the patch is usable to patch the given version of the software package (e.g., and committed using patch commit module 550).

Local Patch Agent

Figure 8:
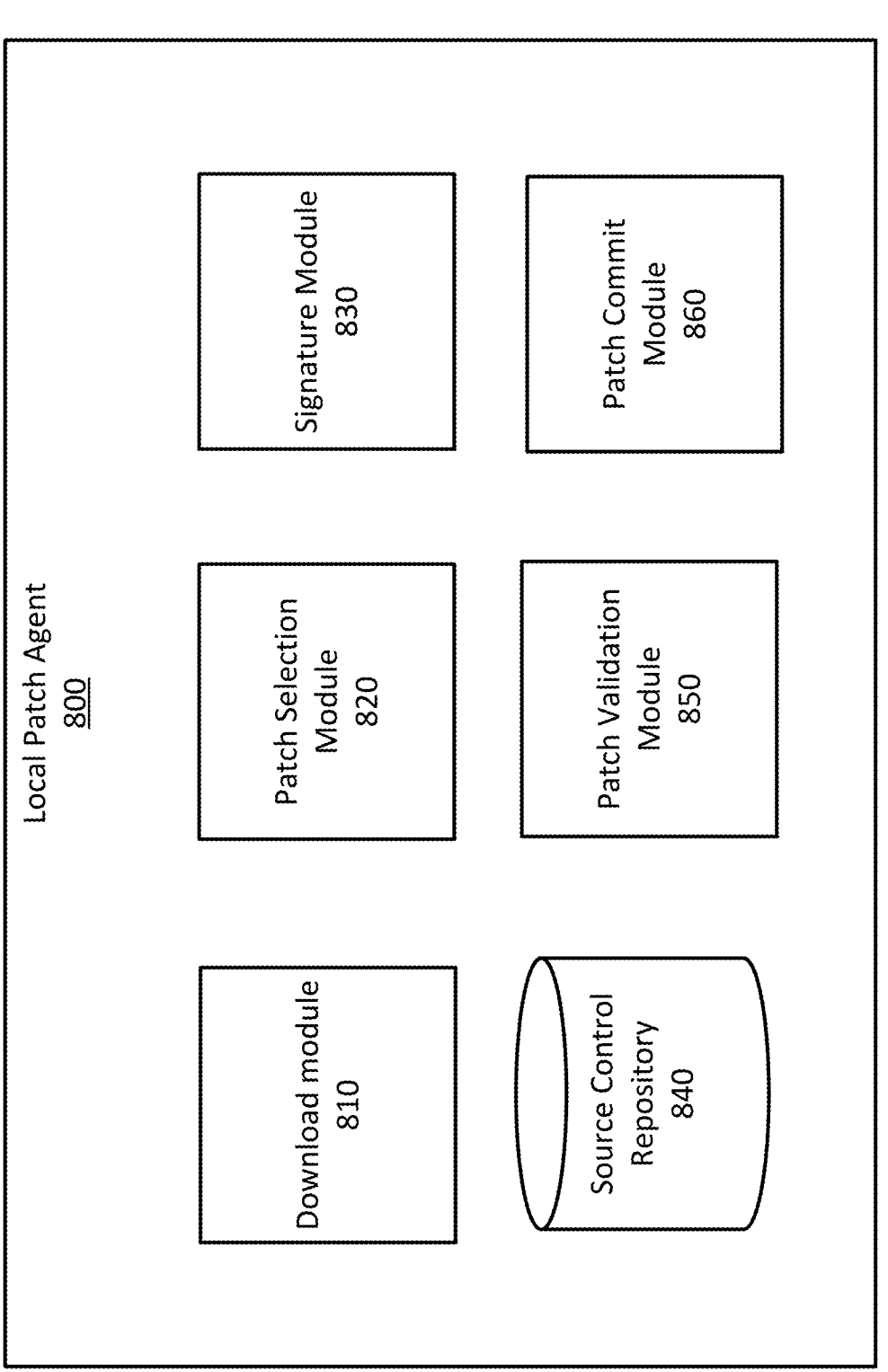
FIG. 8 illustrates a block diagram showing exemplary modules and databases used by a local patch agent, in accordance with an embodiment.

FIG. 8 illustrates a block diagram showing exemplary modules and databases used by a local patch agent, in accordance with an embodiment. As depicted in FIG. 8, local patch agent 800 includes download module 810, patch selection module 820, signature module 830, source code repository 840, patch validation module 850, and patch commit module 860. The modules and databases shown in FIG. 8 are exemplary and non-limiting, and fewer or additional modules and/or databases may be used to achieve functionality disclosed herein.

Local patch agent 800 is installed local to client device 110 (e.g., as application 111, on a separate device local to client device 110, etc.). Local patch agent 800 enables commitment of a patch without a need to access CVEs patch tool 130 at build time. Local patch agent 800 installs patches generated using CVEs patch tool 130 locally to client device 110 (e.g., upon patch generation, periodically, or on some other cadence), and creates a hermetic seal from that point forward where evaluation and commitment of those patches in the context of curing vulnerabilities in dependencies used by a user of client device 110 occurs entirely locally, with no further requirement to connect to CVEs patch tool 130. This may enable patching at build time without connectivity of client device 110 to CVEs patch tool 130.

Download module 810 downloads, from a server (e.g., one or more servers of CVEs patch tool 130, downloaded via network 120), to a client device of the user (and/or another device locally networked to the client device), a plurality of patches, each patch curing a vulnerability in a software package dependency. The patches downloaded and installed to the client device may be generated using the modules of CVEs patch tool 130 depicted in FIG. 2. The patches may be created to patch vulnerable dependencies. The patches may be installed by download module 810 to source control repository 840. Source control repository 840 may be memory of client device 110 and/or may be memory operably coupled to client device 110 and accessible without accessing network 120 and/or accessible accessing network 120 through a secure connection even where access to CVEs patch tool 130 is unavailable. Source control repository 840 stores software packages and source code of the user. Installing the patches to source control repository 840 creates a hermetic seal where a user is not reliant on access to any resource beyond their source control repository in order to patch vulnerabilities in their source code and software packages.

Patch selection module 820 may determine which patches are to be downloaded by download module 810. In some embodiments, patch selection module 820 may perform this determination automatically. For example, patch determination module 820 may determine dependencies within the source code in source control repository 840 by crawling the source code and identifying each dependency within the source code. Patch determination module 820 may then determine which patches are available for the identified dependencies, and may select the available patches for download to source control repository 840. In order to identify which patches are available, each patch may have a data structure referencing a dependency having a given vulnerability that the patch cures, and may additionally have a pointer to where in a database of CVEs patch tool 130 the patch is located for download.

In some embodiments, patch selection module 820 may determine which patches to install based on a selection by the user for check-in into source control repository 820. In some embodiments, the check-in may incur after download of matching set of patches, where the patches are first stored on interim storage local to client device 110, and are then moved when selected for check-in into source control repository 820. In some embodiments, the patches may be identified as matching, but are not downloaded to client device 110 and/or source control repository 820 until a user commands a download of some or all of the matching patches.

Signature module 830 may generate representations of copies of source code prior to (a "before signature"), and after (an "after signature"), a dependency is patched. The representations may be used to determine whether underlying functionality has changed prior to committing a patch to a vulnerable dependency. The signatures may be any representation, such as a hash (e.g., a before hash, an after hash). Signature module 830 may in some embodiments generate the signatures at build time for commitment of patches at build time. Signature module 830 may generate signatures for patched versions of any dependency to which a patch corresponds.

Patch validation module 850 may determine whether a patch is validly applied based on whether the before representation and after representation match. Patch validation module may, in some embodiments, use a Command Line Interface (CLI) component that walks over packages in the source control repository 840, checks whether before and after signatures match for any dependencies having a patch, and replacing files for dependencies that have matching signatures. Patch validation module 850 is able to perform this validation without any extra network connectivity beyond connecting to the source control repository 840. In some embodiments, patch validation module 850 may determine whether a patch is validly applied using techniques disclosed with respect to automatic test generation module 260 (e.g., performed locally rather than at CVEs patch tool 130). Patch commit module 860 may, for validly applied patches, commit the patches. This may be performed in any manner consistent with the foregoing (e.g., described with respect to patch commit module 550).

FIG. 9 illustrates a flowchart of an exemplary process for automatically patching vulnerable dependencies entirely within a local environment, in accordance with an embodiment. As depicted in FIG. 9, process 900 may be executed by one or more processors executing instructions to perform activity described with respect to modules of local patch agent 800. Process 900 begins with local patch agent 800 downloading 910, from a server (e.g., of CVEs patch tool 130), to a client device of the user, a plurality of patches, each patch curing a vulnerability in a software package dependency (e.g., using download module 810). Local patch agent 800 stores 920, to a source control repository of the client device (e.g., source control repository 840), a set of patches from the plurality of patches, the source control repository also comprising source code of the user (e.g., selecting the patches using patch selection module 820).

Local patch agent 800 generates 930, on the client device, a before signature of functionality of source code (e.g., using signature module 830). Local patch agent 800 also generates 940, on the client device, a patched version of the source code by applying a patch from the set of patches to the source code, and generates 950, on the client device, an after signature of functionality of the patched version of the source code (e.g., using signature module 830). Responsive to determining that the before signature and the after signature match, local patch agent 800 commits 960 the patched version of the source code (e.g., using patch validation module 850 and patch commit module 860).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
determining a set of versions of a software package;
running a test having a plurality of components on each version of the set of versions of the software package;
generating a matrix comprising a plurality of vectors, each vector corresponding to a given published version of the software package and having a cell for each component of the plurality of components of the test, the cell populated with a result for that component from the test, wherein each vector of the plurality of vectors is different from each other vector of the plurality of vectors;
identifying a patch for a given version of the software package;
running the test on the patch, an output of the test comprising a vector of results from the test on the patch for each component of the test; and
responsive to determining that the vector of results from the test on the patch matches a given vector corresponding to the given version of the software package, determining that the patch is usable to patch the given version of the software package.

2. The method of claim 1, further comprising determining the test by:
running each version of the set of versions of the software package through a candidate test;
determining that at least two resulting vectors from the candidate test for at least two versions of the set of versions match; and selecting a different candidate test until each resulting vector is unique relative to each other resulting vector.

3. The method of claim 2, wherein the candidate test is extracted from the software package.

4. The method of claim 2, wherein the candidate test is generated by a large language model.

5. The method of claim 1, further comprising, further responsive to determining that the vector of results from the test on the patch matches a given vector corresponding to the given version of the software package, applying the patch to the given version of the software package.

6. The method of claim 1, wherein the patch is generated automatically responsive to detecting a vulnerability.

7. The method of claim 6, wherein the patch is generated based on an existing patch that was also generated to address the vulnerability, and wherein the patch impacts less code than the existing patch when applied to the given version of the software package.

8. A non-transitory computer-readable medium comprising memory with instructions encoded thereon that, when executed by one or more processors, cause the one or more processors to perform operations, the instructions comprising instructions to:
determine a set of versions of a software package;
run a test having a plurality of components on each version of the set of versions of the software package;
generate a matrix comprising a plurality of vectors, each vector corresponding to a given published version of the software package and having a cell for each component of the plurality of components of the test, the cell populated with a result for that component from the test, wherein each vector of the plurality of vectors is different from each other vector of the plurality of vectors;
identify a patch for a given version of the software package;
run the test on the patch, an output of the test comprising a vector of results from the test on the patch for each component of the test; and
responsive to determining that the vector of results from the test on the patch matches a given vector corresponding to the given version of the software package, determine that the patch is usable to patch the given version of the software package.

9. The non-transitory computer-readable medium of claim 8, the instructions further comprising determining the test by:
running each version of the set of versions of the software package through a candidate test;
determining that at least two resulting vectors from the candidate test for at least two versions of the set of versions match; and
selecting a different candidate test until each resulting vector is unique relative to each other resulting vector.

10. The non-transitory computer-readable medium of claim 9, wherein the candidate test is extracted from the software package.

11. The non-transitory computer-readable medium of claim 9, wherein the candidate test is generated by a large language model.

12. The non-transitory computer-readable medium of claim 8, the instructions further comprising instructions to, further responsive to determining that the vector of results from the test on the patch matches a given vector corresponding to the given version of the software package, apply the patch to the given version of the software package.

13. The non-transitory computer-readable medium of claim 8, wherein the patch is generated automatically responsive to detecting a vulnerability.

14. The non-transitory computer-readable medium of claim 13, wherein the patch is generated based on an existing patch that was also generated to address the vulnerability, and wherein the patch impacts less code than the existing patch when applied to the given version of the software package.

15. A system comprising:

memory with instructions encoded thereon; and one or more processors that, when executing the instructions, are caused to perform operations comprising:

determining a set of versions of a software package;

running a test having a plurality of components on each version of the set of versions of the software package;

generating a matrix comprising a plurality of vectors, each vector corresponding to a given published version of the software package and having a cell for each component of the plurality of components of the test, the cell populated with a result for that component from the test, wherein each vector of the plurality of vectors is different from each other vector of the plurality of vectors;

identifying a patch for a given version of the software package;

running the test on the patch, an output of the test comprising a vector of results from the test on the patch for each component of the test; and responsive to determining that the vector of results from the test on the patch matches a given vector corresponding to the given version of the software package, determining that the patch is usable to patch the given version of the software package.

16. The system of claim 15, the operations further comprising determining the test by:

running each version of the set of versions of the software package through a candidate test;

determining that at least two resulting vectors from the candidate test for at least two versions of the set of versions match; and selecting a different candidate test until each resulting vector is unique relative to each other resulting vector.

17. The system of claim 16, wherein the candidate test is extracted from the software package.

18. The system of claim 16, wherein the candidate test is generated by a large language model.

19. The system of claim 15, the operations further comprising, further responsive to determining that the vector of results from the test on the patch matches a given vector corresponding to the given version of the software package, applying the patch to the given version of the software package.

20. The system of claim 15, wherein the patch is generated automatically responsive to detecting a vulnerability.

* * * * *